(12) United States Patent
Yamaji

(10) Patent No.: US 11,341,675 B2
(45) Date of Patent: May 24, 2022

(54) IMAGE PROCESSING APPARATUS, IMAGE PROCESSING METHOD, AND IMAGE PROCESSING PROGRAM

(71) Applicant: FUJIFILM Corporation, Tokyo (JP)

(72) Inventor: Kei Yamaji, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 66 days.

(21) Appl. No.: 16/543,296

(22) Filed: Aug. 16, 2019

(65) Prior Publication Data

US 2020/0090369 A1    Mar. 19, 2020

(30) Foreign Application Priority Data

Sep. 19, 2018    (JP) .............................. JP2018-174488

(51) Int. Cl.

| | |
|---|---|
| *G06T 7/73* | (2017.01) |
| *G06T 7/00* | (2017.01) |
| *G06K 9/62* | (2022.01) |
| *G06V 20/30* | (2022.01) |
| *G06F 16/538* | (2019.01) |

(Continued)

(52) U.S. Cl.
CPC ................ *G06T 7/74* (2017.01); *G06F 16/53* (2019.01); *G06F 16/538* (2019.01); *G06F 16/55* (2019.01); *G06K 9/6215* (2013.01); *G06K 9/6223* (2013.01); *G06K 9/6253* (2013.01); *G06K 9/6255* (2013.01); *G06T 7/97* (2017.01); *G06V 20/30* (2022.01); *G06T 2207/20092* (2013.01); *G06T 2207/20212* (2013.01)

(58) Field of Classification Search
None
See application file for complete search history.

(56) References Cited

U.S. PATENT DOCUMENTS 4,965,558 A * 10/1990 Saki ........................ G06F 16/54
345/156
6,907,141 B1    6/2005 Okamoto
(Continued)

FOREIGN PATENT DOCUMENTS

| JP | 2001-256244 A | 9/2001 |
|---|---|---|
| JP | 2002-312592 A | 10/2002 |

(Continued)

OTHER PUBLICATIONS

Dmitry Kuzovkin et al; "Context-aware Clustering and Assessment of Photo Collections"; Proceeding of the Symposium on Computational Aesthetics; CAE '17; Jan. 1, 2017; pp. 1-10; XP055665419; New York, New York, USA.

(Continued)

*Primary Examiner* — Emily C Terrell
*Assistant Examiner* — Nathan J Bloom
(74) *Attorney, Agent, or Firm* — Studebaker & Brackett PC

(57) ABSTRACT

An image processing apparatus, an image processing method, and an image processing program capable of creating an image product by extracting an image having a theme matching an interest and taste of a user are provided. A plurality of images are classified into a plurality of image groups using feature amounts of the images such that images having a similarity greater than or equal to a threshold are grouped. An image is extracted from the plurality of classified image groups. An album is created using the extracted image.

15 Claims, 9 Drawing Sheets

(51) Int. Cl.
  *G06F 16/53* (2019.01)
  *G06F 16/55* (2019.01)

(56) References Cited

U.S. PATENT DOCUMENTS

| | | | | |
|---|---|---|---|---|
| 8,428,397 | B1* | 4/2013 | Brandt | G06K 9/6272 |
| | | | | 382/305 |
| 8,885,952 | B1* | 11/2014 | Filip | G06F 16/583 |
| | | | | 382/225 |
| 2005/0203970 | A1* | 9/2005 | McKeown | G06Q 10/10 |
| 2006/0020597 | A1* | 1/2006 | Keating | G06F 16/5838 |
| 2006/0193538 | A1 | 8/2006 | Vronay et al. | |
| 2008/0292212 | A1 | 11/2008 | Ozaki | |
| 2011/0126148 | A1* | 5/2011 | Krishnaraj | G06F 3/04842 |
| | | | | 715/784 |
| 2012/0254790 | A1* | 10/2012 | Colombino | G06F 16/54 |
| | | | | 715/781 |
| 2013/0336543 | A1* | 12/2013 | Bennett | G06K 9/00677 |
| | | | | 382/112 |

FOREIGN PATENT DOCUMENTS

| | | | |
|---|---|---|---|
| JP | 2006-065368 A | 3/2006 | |
| JP | 2007-058792 A | 3/2007 | |
| JP | 2007058792 A * | 3/2007 | ............. G06F 17/30 |
| JP | 2009-116820 A | 5/2009 | |
| JP | 2012-138679 A | 7/2012 | |
| JP | 2014-154971 A | 8/2014 | |
| JP | 2015-035135 A | 2/2015 | |
| JP | 2018-045582 A | 3/2018 | |

OTHER PUBLICATIONS

The extended European search report issued by the European Patent Office dated Feb. 13, 2020, which corresponds to European Patent Application No. 19193361.3-1207 and is related to U.S. Appl. No. 16/543,296.

Communication pursuant to Article 94(3) EPC issued by the European Patent Office dated Nov. 19, 2021, which corresponds to European Patent Application 19193361.3-1207 and is related to U.S. Appl. No. 16/543,296.

An Office Action; "Notice of Reasons for Refusal", mailed by the Japanese Patent Office dated Aug. 17, 2021, which corresponds to Japanese Patent Application No. 2018-174488 and is related to U.S. Appl. No. 16/543,296; with English language translation.

* cited by examiner

IMAGE PROCESSING APPARATUS, IMAGE PROCESSING METHOD, AND IMAGE PROCESSING PROGRAM

CROSS-REFERENCE TO RELATED APPLICATIONS

The present application claims priority under 35 U.S.C. § 119 to Japanese Patent Application No. 2018-174488, filed Sep. 19, 2018. Each of the above application(s) is hereby expressly incorporated by reference, in its entirety, into the present application.

BACKGROUND OF THE INVENTION

1. Field of the Invention

The invention relates to an image processing apparatus, an image processing method, and an image processing program.

2. Description of the Related Art

The number of captured images is significantly increased along with wide use of digital cameras, smartphones, and the like. It is difficult to find a desired image from multiple images. Thus, in order to easily search for the image, for example, it is considered that images are classified into relatively appropriate image groups (JP2012-138679A), image data belonging to an image group is easily compared and browsed (JP2015-035135A), or a representative image is displayed (JP2014-154971A).

SUMMARY OF THE INVENTION

A program for extracting an image from multiple images for each of generally widely used themes such as a travel album and a wedding album is created. However, considering effort of developing the program, it is not realistic to create the program corresponding to all themes. In the disclosure of JP2012-138679A, images are classified into image groups based on a dissimilarity between temporally consecutively captured images, and creating an image product such as an album in accordance with a certain theme is not considered. In the disclosure of JP2015-035135A, classification is performed based on imaging time data. Thus, an image product such as an album corresponding to a certain theme cannot be created. In the disclosure of JP2014-154971A, multiple image data are derived from one image data. Thus, extracting an image from multiple independent images in accordance with a certain theme is not considered.

An object of the invention is to create an image product by extracting an image having a theme matching the interest and taste of a user.

An image processing apparatus according to the invention comprises an image classification device (an image classification device) for classifying a plurality of images into a plurality of image groups such that images having a similarity greater than or equal to a threshold are grouped, and an image extraction device (image extraction means) for extracting an image from images included in the plurality of image groups classified by the image classification device.

The invention also provides an image processing method suitable for the image processing apparatus. That is, the method comprises classifying a plurality of images into a plurality of image groups by a image classification device (image classification means) such that images having a similarity greater than or equal to a threshold are grouped, and extracting an image by an image extraction device (image extraction means) from images included in the plurality of image groups classified by the image classification device.

The invention may provide an image processing apparatus as follows. That is, the image processing apparatus comprises a processor that classifies a plurality of images into a plurality of image groups such that images having a similarity greater than or equal to a threshold are grouped, and extracts an image from images included in the plurality of classified image groups.

In addition, a program readable by a computer of the image processing apparatus and a recording medium storing the program are provided.

The image processing apparatus may further comprise an image product creation device (image product creation means) for creating an image product using the image extracted by the image extraction device.

For example, the image extraction device extracts the image from each image group depending on a ratio of the number of images included in each image group of the plurality of image groups.

The image extraction device may extract the image from image groups in which a ratio of the number of images included in each image group of the plurality of image groups is not equal to zero and is greater than or equal to a threshold.

The image extraction device may extract the image from the image groups in which the ratio of the number of images included in each image group of the plurality of image groups is not equal to zero and is greater than or equal to the threshold depending on the ratio of the number of images included in the image group.

For example, the image extraction device may extract the image from any one image group of the image groups in which the ratio of the number of images included in each image group of the plurality of image groups is not equal to zero and is greater than or equal to the threshold.

The image extraction device may extract the image from images included in one image group of the plurality of image groups.

The image processing apparatus may further comprise a notification device (notification means) for performing notification of a ratio of the number of images included in each image group of the plurality of image groups.

The image processing apparatus may further comprise a specifying device (specifying means) for specifying a ratio of the number of images to be extracted from each image group of the plurality of image groups. In this case, for example, the image extraction device extracts the image from each image group depending on the ratio specified by the specifying device.

The image processing apparatus may further comprise a first display control device (first display control means) for controlling a display device to display a representative image of images included in each image group of the plurality of image groups on a display screen. In this case, for example, the specifying device comprises a second display control device (second display control means) for controlling the display device to display a specifying unit specifying the ratio of images in correspondence with the representative image on the display screen.

The image processing apparatus may further comprise a third display control device (third display control means) for controlling the display device to display a marker of which a display position is changeable on the display screen. In this case, the specifying unit may specify the ratio of the images depending on the position of the marker.

The image processing apparatus may further comprise a fourth display control device (fourth display control means) for controlling the display device to display a graph having a length or an area corresponding to the ratio of the number of images on the display screen. In this case, the specifying unit may specify the ratio of the images by changing the length or the area of the graph.

The image processing apparatus may further comprise an input device (input means) for inputting the number of image groups to be classified in the image classification device. In this case, for example, the image classification device performs the classifying into image groups corresponding to the number input from the input device.

For example, the image classification device may perform the classifying into the plurality of image groups based on a plurality of feature amounts of the images such that the images having the similarity greater than or equal to the threshold are grouped.

For example, the image classification device may perform the classifying into a first plurality of image groups based on a plurality of feature amounts of the images such that the images having the similarity greater than or equal to the threshold are grouped, and classify the plurality of images into the plurality of image groups such that the images having the similarity greater than or equal to the threshold are grouped by combining image groups in which the similarity between the image groups is greater than or equal to the threshold among the first plurality of image groups.

For example, the image classification device may not have a function of performing the classifying into the plurality of image groups based on a similarity between subjects recognized as being included in the images.

The plurality of classified image groups are groups of similar images and thus, are considered to be groups of images having a certain theme. By creating the image product from the images included in the plurality of image groups, the image product having a certain theme can be created.

DESCRIPTION OF THE PREFERRED EMBODIMENTS

Main Example

Figure 1:
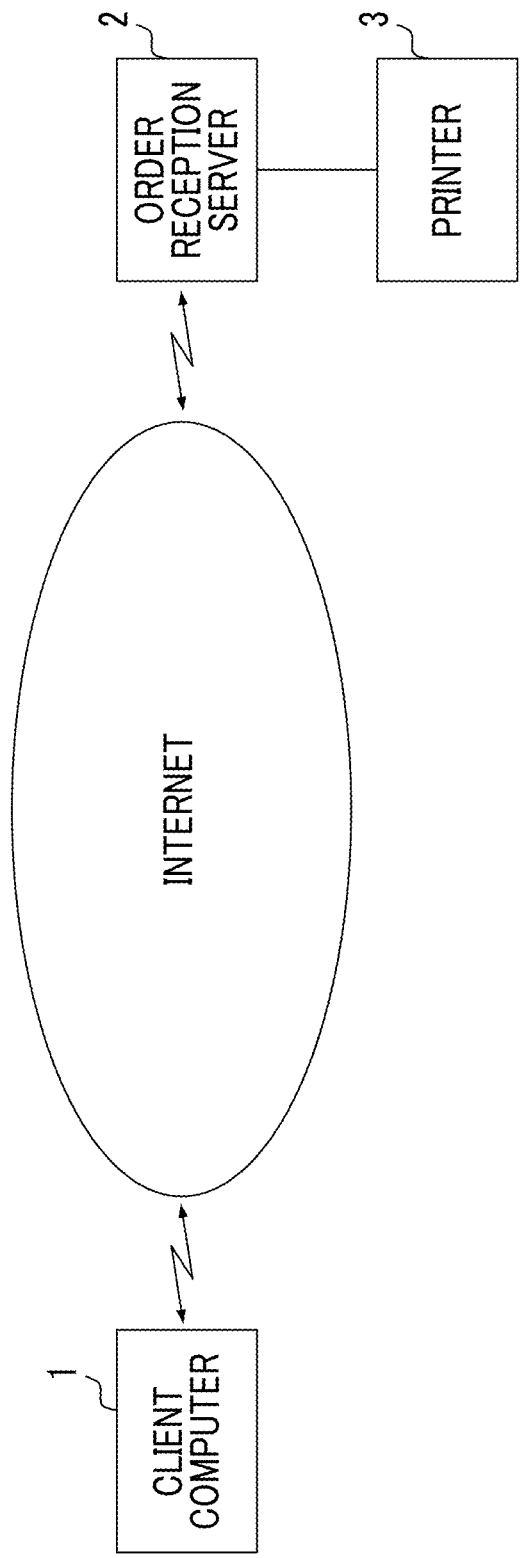
FIG. 1 illustrates a summary of an image processing system.

FIG. 1 illustrates an example of the invention and illustrates a summary of an image processing system.

The image processing system is a system creating an album by extracting an image from a plurality of images.

The image processing system includes a client computer 1 (one example of an image processing apparatus), an order reception server 2, and a printer 3. The client computer 1 and the order reception server 2 can communicate through the Internet. The printer 3 is connected to the order reception server 2.

In the client computer 1, an image is extracted from a plurality of images, and image data representing the extracted image is transmitted to the order reception server 2. The image data is transmitted to the printer 3 from the order reception server 2, and an album is created in the printer 3. The created album is sent to a user of the client computer 1.

Figure 2:
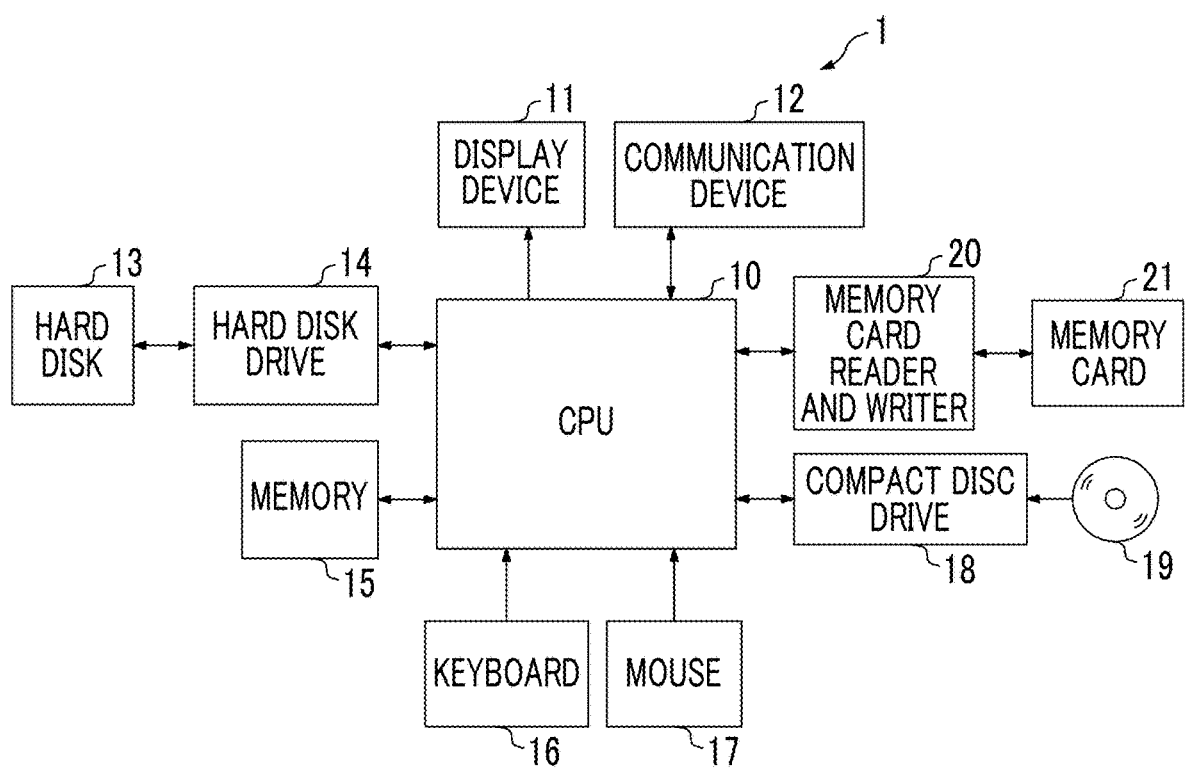
FIG. 2 is a block diagram illustrating an electric configuration of a client computer.

FIG. 2 is a block diagram illustrating an electric configuration of the client computer 1.

The operation of the whole client computer 1 is managed by a central processing unit (CPU) 10.

The client computer 1 includes a display device 11 displaying images and other information on a display screen and a communication device 12 communicating with an apparatus and the like other than the client computer 1 by connecting to the Internet and other networks. In addition, the client computer 1 includes a hard disk 13, a hard disk drive 14 accessing the hard disk 13, a memory 15 storing data and the like, and a keyboard 16 and a mouse 17 for inputting a command and the like. Furthermore, the client computer 1 includes a compact disc drive 18 accessing a compact disc 19 and a memory card reader and writer 20 writing data into a memory card 21 and reading data recorded in the memory card 21.

An operation program of the client computer 1 described below is received in the communication device 12 through the Internet. The received operation program is installed on the client computer 1. The operation program may not be received in the client computer 1 through a network such as the Internet and installed on the client computer 1. The operation program may be recorded in a portable recording medium such as the compact disc 19 and read from the portable recording medium. In that case, the operation program read from the portable recording medium is installed on the client computer 1. The operation program can also be read by a computer (CPU 10) of the client computer 1.

Figure 3:
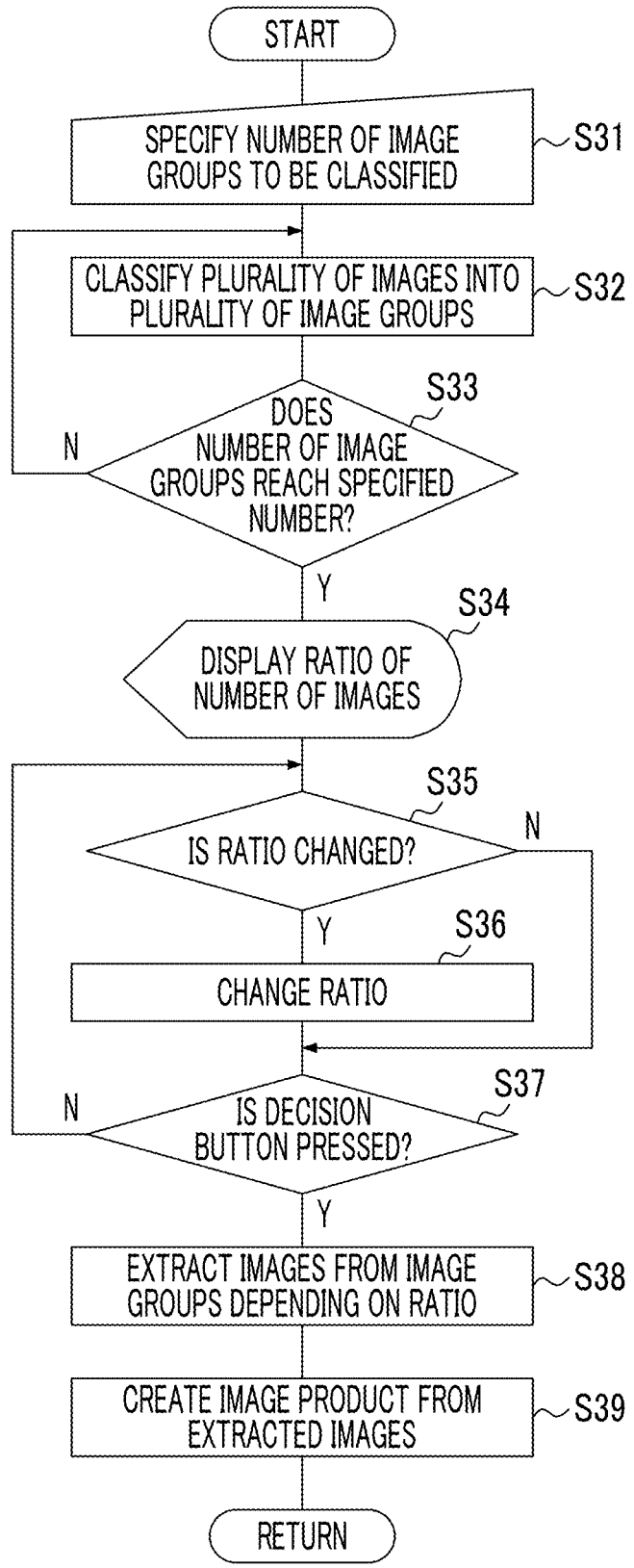
FIG. 3 is a flowchart illustrating a process procedure of the client computer.

FIG. 3 is a flowchart illustrating a process procedure of the client computer 1.

In the example, a plurality of images are classified into a plurality of image groups such that similar images are grouped. The number of classifications of the image groups is specified by the user (step S31).

Figure 4:
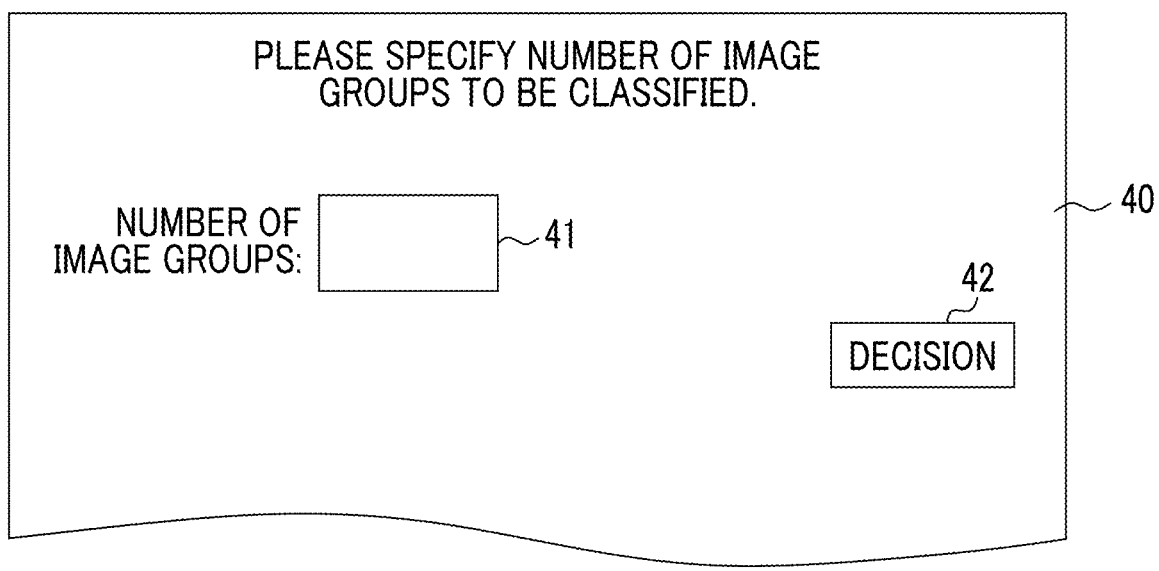
FIG. 4 is one example of a display screen.

FIG. 4 is one example of the display screen of the display device 11.

In a case where an image processing program according to the example is started, a classification number specifying screen illustrated in FIG. 4 is displayed on a display screen 40 of the display device 11.

A window 41 for inputting the number of image groups to be classified is formed in the classification number specifying screen. The number of image groups to be classified is input in the window 41 using the keyboard 16 (one example of an input device). A decision button 42 on which a text "decision" is displayed is formed in the classification number specifying screen. The user inputs the number of images to be classified in the window 41. In a case where the user is satisfied with the number, the user presses the decision button 42, and the number of classifications is specified. In the example, it is assumed that the number of classifications of the image groups is specified to be "4". For example, images to be classified into the plurality of image groups are stored in advance in the memory of the client computer 1 (or may be another recording medium such as the memory card 21) per folder. By the user specifying the folder, a plurality of images stored in the specified folder are classified into the plurality of image groups (step S32).

Figure 5:
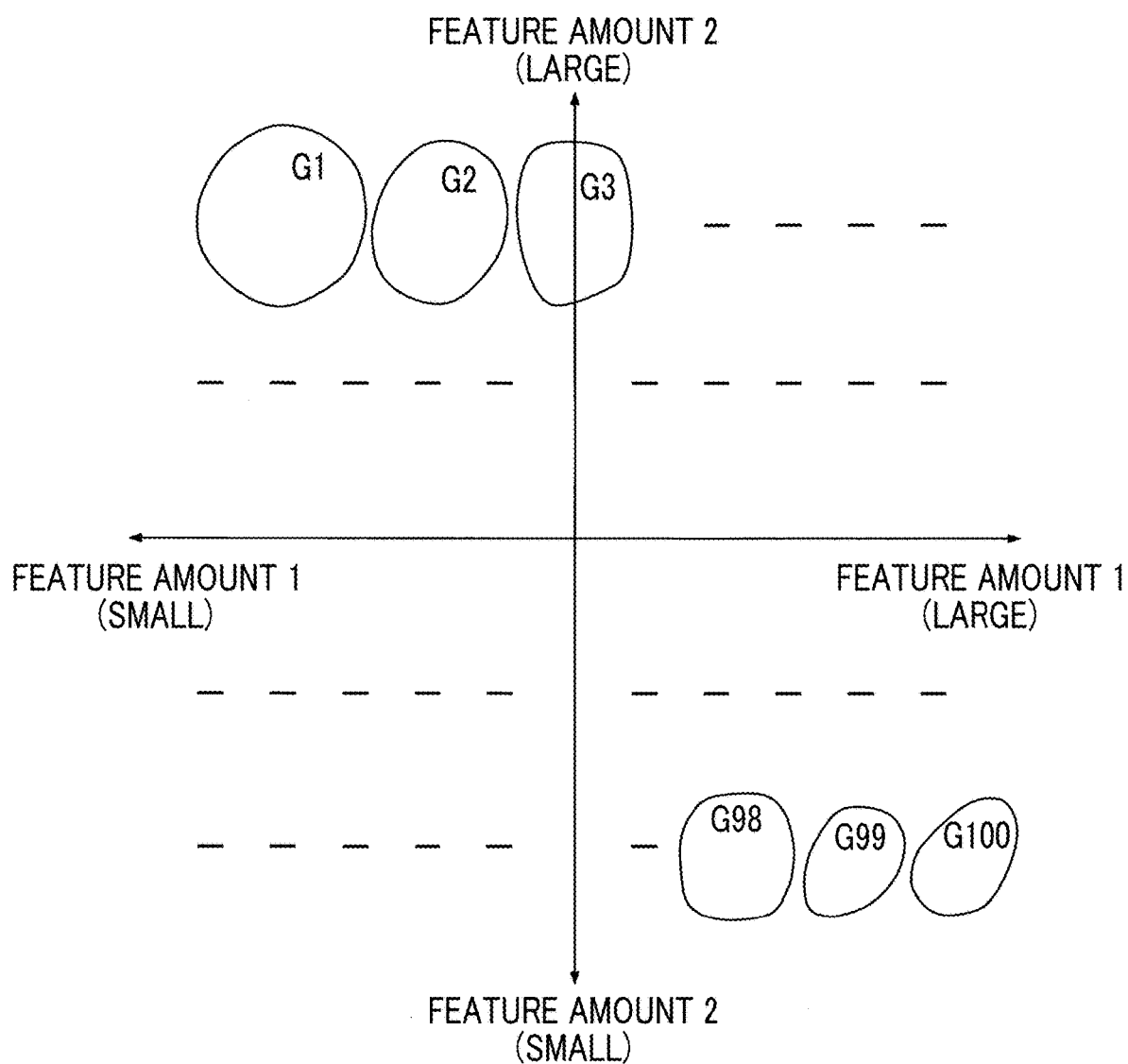
FIG. 5 is one example of image groups combined in a feature amount space.

FIG. 5 illustrates a state where the plurality of images are classified into the plurality of image groups (one example of a first plurality of image groups).

In FIG. 5, the horizontal axis denotes a first feature amount, and the vertical axis denotes a second feature amount. It is assumed that the plurality of images are distributed at positions defined by the two feature amounts. The number of feature amounts may not be two, and three or more feature amounts may be used. Each image is distributed in a feature amount space of which the number of dimensions is equal to the number of feature amounts. As the distance between images in the feature amount space is decreased, the similarity between image groups is increased.

In the example, the feature amount may be the resolution of the image, the amount of data, the degree of blurriness, the type of main subject, a relative size of the main subject with respect to the image, the position of the main subject, a tint, or the like or may be generated by combining a plurality of these feature amounts. Furthermore, the feature amount may be configured with a plurality of parameters that a learned model learned in advance by supervised learning or unsupervised learning outputs by receiving an input of the image. The feature amount output from the learned model may not be interpreted by a human being. A numeric value group that is uniquely output when at least one image is input can be used as the feature amount according to the example of the present invention. The feature amount is information necessary for classifying the plurality of images into the plurality of image groups.

In FIG. 5, a plurality of classification target images are divided by the CPU 10 into 100 image groups including an image group G1 to an image group G100. For example, the grouping can be implemented using the k-means method. In a case where a feature amount of an image is extracted in advance from the actual image, the grouping can be performed using the feature amount of the image even in a case where the actual image is not present.

Figure 6:
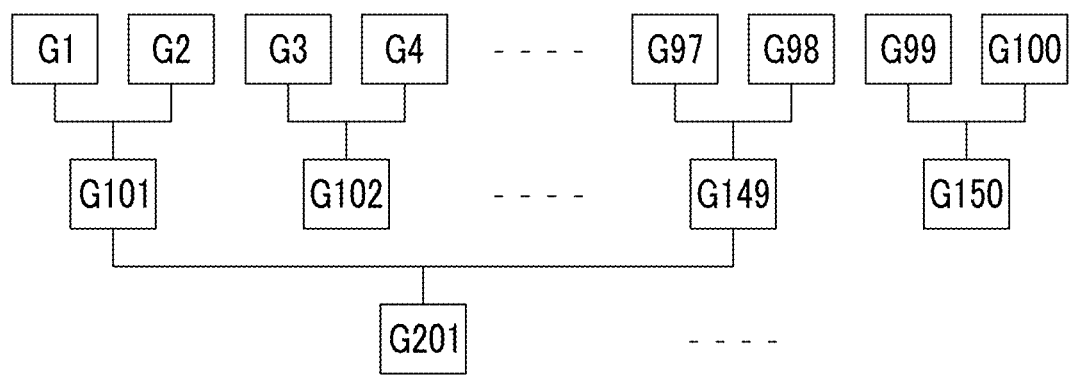
FIG. 6 illustrates a state where the image groups are combined.

FIG. 6 illustrates a state of classification into a plurality of image groups including the image group G1 to the image group G100.

Next, the CPU 10 determines whether or not the similarity between the image groups is within a threshold, and image groups within the threshold are combined. For example, the similarity between the image groups may be such that the centroid of each of the image group G1 to the image group G100 in the feature amount space illustrated in FIG. 5 is obtained, and the similarity between the centroids is used. The threshold may use a predetermined value or may be changed such that the number of image groups becomes equal to the specified number as will be described below.

For example, in a case where the similarity between the image group G1 and the image group G2 (similarity between the centroid of the image group G1 and the centroid of the image group G2) is within the threshold, a new image group G101 is generated by combining the image group G1 and the image group G2. Similarly, in a case where the similarity between the image group G3 and the image group G4 is within the threshold, a new image group G102 is generated by combining the image group G3 and the image group G4. Similarly, a new image group G149 is generated by combining the image group G97 and the image group G98. A new image group G150 is generated by combining the image group G99 and the image group G100. The newly generated image groups are also combined in a case where the similarity between the image groups is within the threshold. For example, a new image group G201 is generated by combining the image group G101 and the image group G149.

The process of combining the image groups by changing the threshold is repeated until the number of image groups becomes equal to the specified number (step S33). Specifically, a process of combining the image groups using a certain threshold as a reference and performing the combining by decreasing the threshold of the similarity by a certain amount (that is, images at a distance equal to a certain distance in the feature amount space are included in the image group) in a case where the number of resulting image groups is greater than or equal to the specified number is performed again. The combining of the image groups and the change of the threshold are repeated until the number of image groups becomes equal to the specified number. As another specific example, after the number of image groups reaches the specified number, the width of decrease in threshold of the similarity may be decreased (that is, after the number of image groups reaches the specified number, only image groups separated by a small distance are combined in the repetition of the combining process). Consequently, in a case where the specified number is four, the combining process is finished in a case where the distances among four image groups are sufficiently long. Meanwhile, in a case where two image groups are slightly close in the distances among the four image groups, the two image groups are combined, and the four image groups are combined to three image groups. This specific example is expected to match intuitive grouping from the viewpoint of a human being and thus, is suitably used. In the present example, it is assumed that the specified number is four, and four image groups G301 to G304 are generated (refer to FIG. 7).

Figure 7:
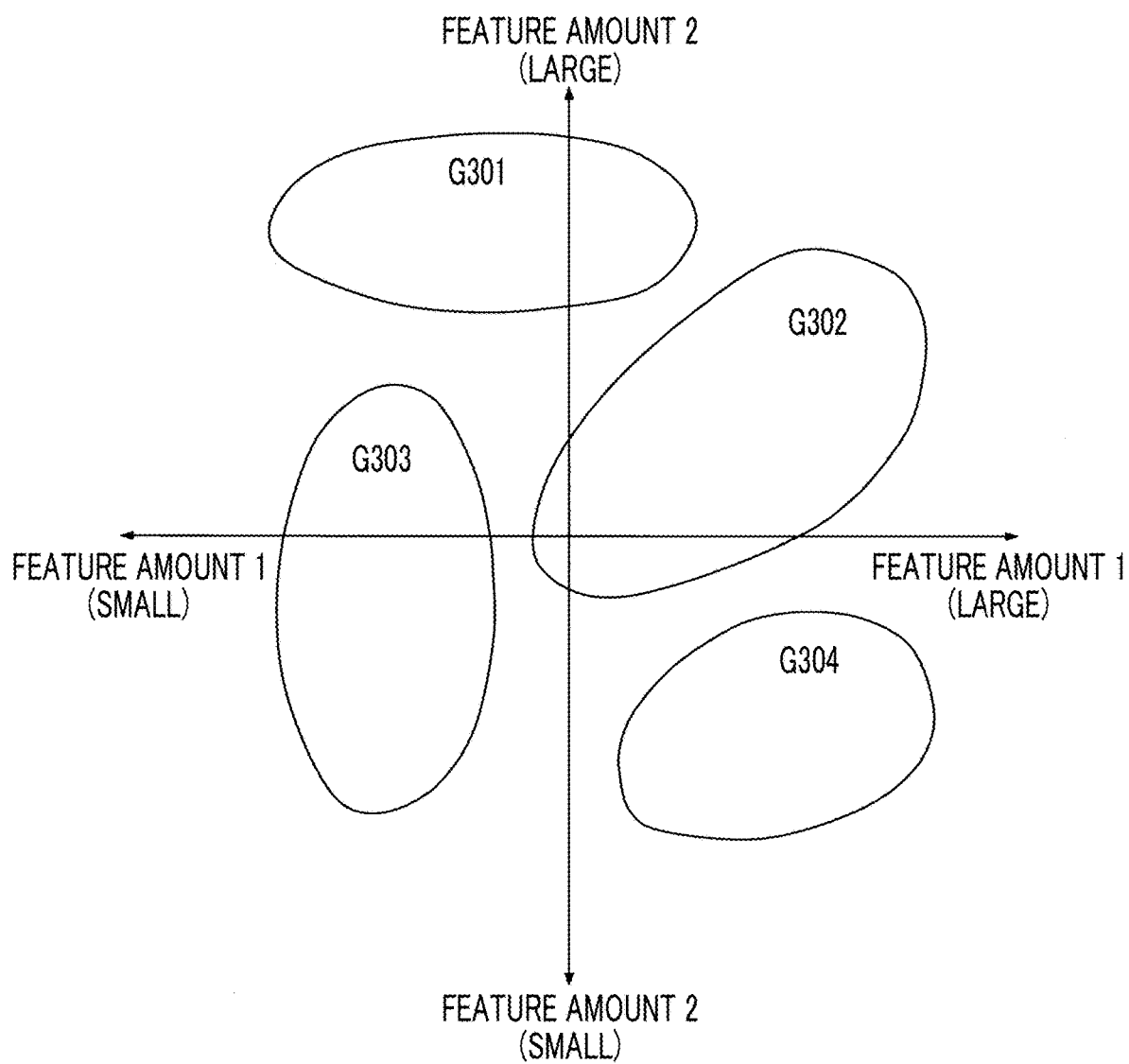
FIG. 7 is one example of image groups combined in the feature amount space.

FIG. 7 illustrates a state where the image groups are divided in specified number.

In FIG. 7, in the same manner as FIG. 5, the horizontal axis denotes the first feature amount, and the vertical axis denotes the second feature amount. A plurality of images are classified into the four image groups G301 to G304. Each of the four image groups G301 to G304 is a group of images having the similarity between the images obtained from a plurality of feature amounts greater than or equal to the threshold. In the present example, an image included in each classified image group is not classified by recognizing a subject included in the image. Images considered to be similar from objective feature amounts are classified. The client computer 1 does not recognize the main subject represented by the image included in each of the image groups G301 to G304. The CPU 10 of the client computer 1 may not have a function of classifying a plurality of image groups based on the similarity between subjects recognized as being included in the images. A plurality of images can be classified into a plurality of image groups without recognizing the subjects included in the images.

In a case where the number of image groups becomes equal to the specified number (YES in step S33), the ratio of the number of images is calculated for each classified image group, and a ratio change screen is displayed on the display screen 40 of the display device 11 (step S34).

Figure 8:
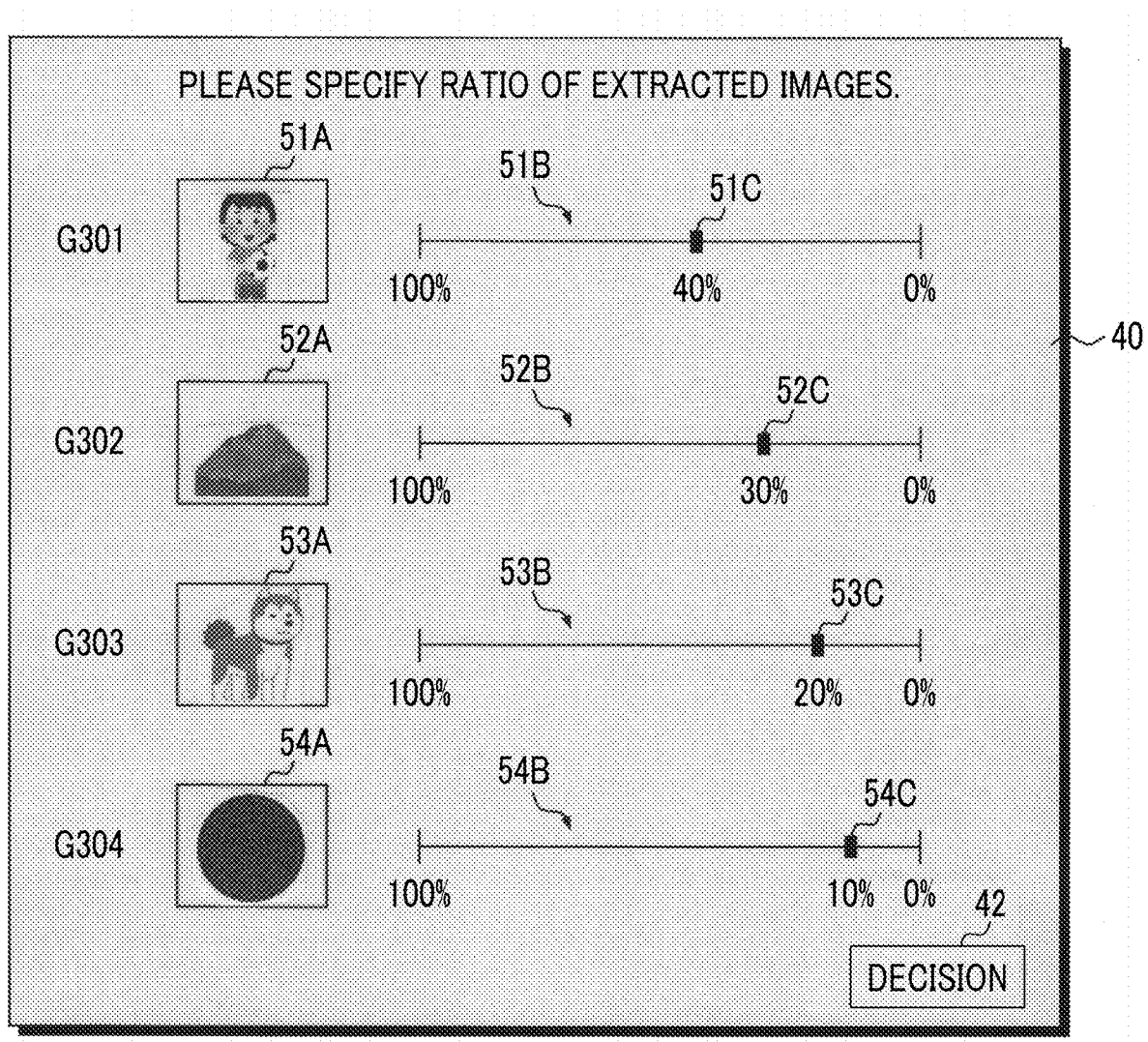
FIG. 8 is one example of the display screen.

FIG. 8 is one example of the ratio change screen.

Representative images 51A. 52A. 53A, and 54A are displayed by the CPU 10 (one example of a first display control device) in correspondence with the classified four image groups G301, G302, G303, and G304, respectively. The representative images 51A, 52A, 53A, and 54A are images distributed at the centroid positions of the four image groups G301, G302, G303, and G304, respectively (a few images included in each of the four image groups G301, G302, G303, and G304 may be extracted and displayed as a representative image group of the image group). By seeing the representative image 51A, the user perceives that the image group G301 is a group of images of persons. By seeing the representative image 52A, the user perceives that the image group G302 is a group of images of scenery. By seeing the representative image 53A, the user perceives that the image group G303 is a group of images of dogs. By seeing the representative image 54A, the user perceives that the image group G304 is a group of images of manholes. At this point, the CPU 10 of the client computer 1 does not need to recognize the type of group of subjects of each image group. For convenience of the user, a text such as "person", "scenery", and the like may be displayed along with the representative image by recognizing the type of group of subjects of the image group by performing image analysis after dividing the image group.

Slide bars 51B. 52B, 53B, and 54B (one example of a specifying unit) are displayed by the CPU 10 (one example of a second display control device) on the right sides of the representative images 51A, 52A, 53A, and 54A, respectively, on the display screen 40 of the display device 11. Sliders 51C, 52C, 53C, and 54C (one example of a marker) of which the display positions are changeable in the left-right direction by the mouse 17 are displayed by the CPU 10 (one example of a third display control device) in the slide bars 51B, 52B, 53B, and 54B, respectively, on the display screen of the display device 11. The ratio of extracted images changes depending on the positions of the sliders 51C. 52C, 53C, and 54C. As the position of the slider 51C, 52C, 53C, or 54C is moved to the right side, the ratio of images extracted from each image group G301, G302. G303, or G304 is decreased. In a case where the position of the slider 51C, 52C, 53C, or 54C is moved to the rightmost side, the ratio of images extracted from each image group G301, G302, G303, or G304 is zero. As the position of the slider 51C, 52C, 53C, or 54C is moved to the left side, the ratio of images extracted from each image group G301, G302, G303, or G304 is increased. In a case where the position of the slider 51C. 52C, 53C, or 54C is moved to the leftmost side, the ratio of images extracted from each image group G301, G302, G303, or G304 is 100%. In a case where the total of the ratio of images extracted from each image group G301, G302, G303, or G304 exceeds 100%, the ratio of extracted images is decided as a ratio at which the total is 100%. For example, in a case where all of the sliders 51C, 52C, 53C, and 54C are specified at 100%, images included in the image groups G301, G302, G303, and G304 are extracted at a ratio of 1:1:1:1. In a case where the sliders 51C and 52C are specified at 100% and the sliders 53C and 54C are specified at 50%, images included in the image groups G301, G302, G303, and G304 are extracted at a ratio of 2:2:1:1. The same applies to other cases.

In an initial state before changing the positions of the sliders 51C, 52C, 53C, and 54C, the positions of the sliders 51C, 52C, 53C, and 54C correspond to the ratios of images included in the image groups G301, G302, G303, and G304 among the plurality of images (images included in the folder initially specified by the user), and the ratios are displayed. By seeing the positions and the ratios of the sliders 51C, 52C, 53C, and 54C, the user can perceive the ratio of images included in each of the image groups G301, G302. G303, and G304.

The ratios of images included in the image groups G301, G302, G303, and G304 are 40%, 30%, 20%, and 10%, respectively, among the plurality of images. Thus, in the initial state, the ratios 40%, 30%, 20%, and 10% are displayed on the display screen of the display device 11 (one example of a notification device). In a case where the decision button 42 is pressed in the initial state without changing the positions of the sliders 51C, 52C, 53C, and 54C (NO in step S35 and YES in step S37), images are extracted by the CPU 10 (one example of an image extraction device) from the image groups G301. G302, G303, and G304 at a ratio corresponding to the ratios of images included in the image groups G301, G302, G303, and G304, respectively (step S38). The number of extracted images depends on the number of attached templates of the album selected in advance by the user.

By attaching the extracted images to the templates of the album, an electronic album (one example of an image product) is created in the CPU 10 (one example of an image product creation device) (step S39).

In a case where the position of at least one of the sliders 51C, 52C, 53C and 54C is changed by the user (YES in step S35), the ratio of images extracted from each of the image groups G301, G302, G303, and G304 is changed depending on the changed position (step S36). In a case where the decision button 42 is pressed (YES in step S37), images are extracted from each of the image groups G301, G302. G303, and G304 at the changed ratio (step S38). The electronic album is created using the extracted images (step S39).

Data representing the created electronic album is transmitted to the order reception server 2 from the client computer 1. The data representing the electronic album and received in the order reception server 2 is provided to the printer 3, and the album is printed. In a case where the album is created in such a manner, the created album is sent to the user. The image data representing the extracted images may be transmitted to the order reception server 2, and the electronic album may be created in the order reception server 2.

The classified image group is a group of similar images and thus, is considered to be a group of images corresponding to a certain theme. The album corresponding to the theme is created. The number of captured images is considered to depend on the preference of the user. As the number of images is increased, it is considered that the user is interested in the subjects represented by the images. In a case where the album is created using the images extracted from the image groups G301, G302, G303, and G304 depending on the number of images included in the image groups G301, G302, G303, and G304, the album including a large number of images of interest to the user is created. In addition, in a case where the ratio of extracted images is changed, the album including a large number of images matching the preference of the user can be created.

Another Example

Figure 9:
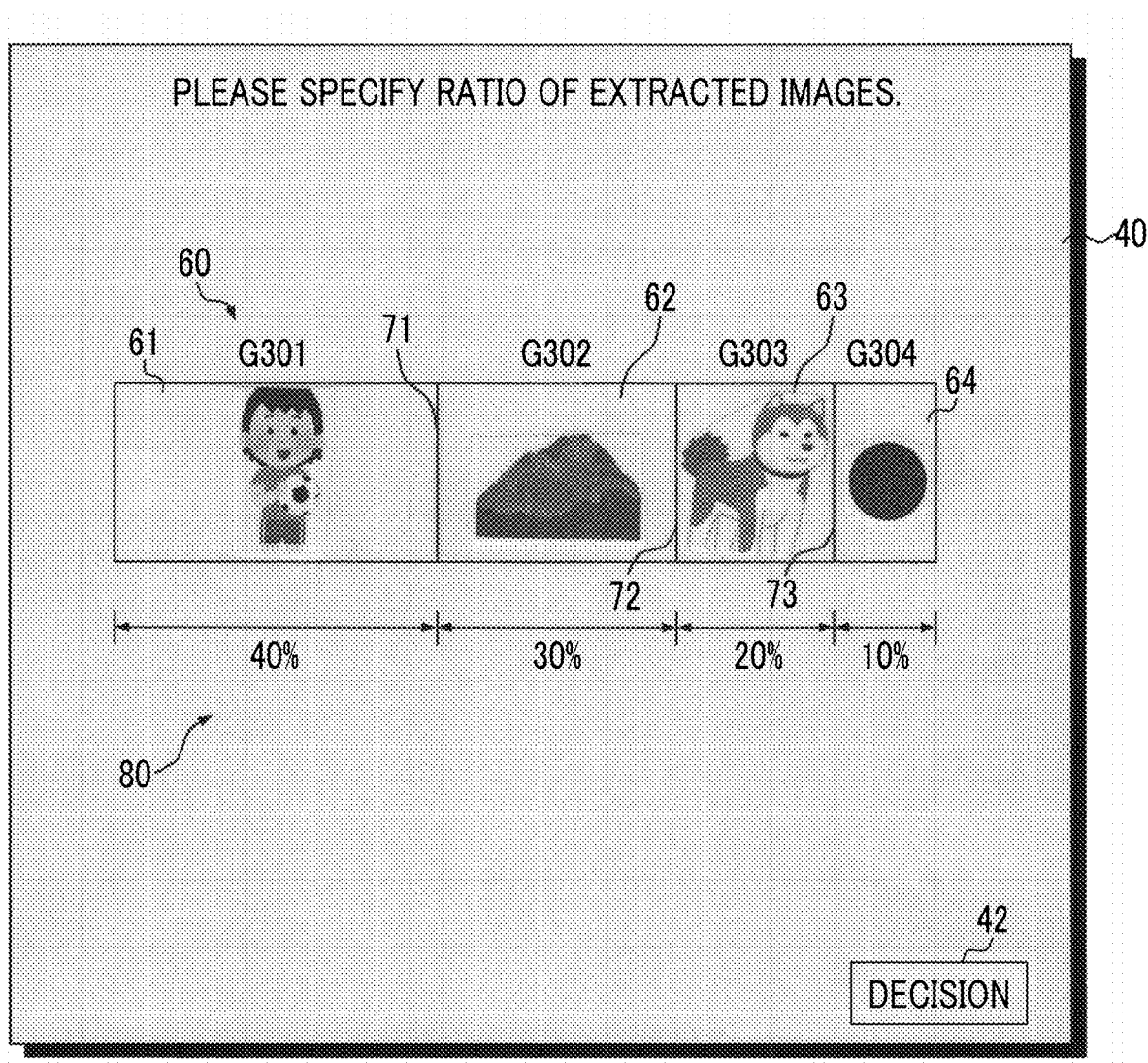
FIG. 9 is one example of a display screen.

FIG. 9 illustrates another example and is one example of the ratio change screen displayed on the display screen 40 of the display device 11.

A graph 60 extending in the horizontal direction is displayed on the ratio change screen under control of the CPU 10 (one example of a fourth display control device). Regions 61, 62, 63, and 64 corresponding to the four image groups G301, G302, G303, and G304 are formed in the graph 60. The widths of the regions 61, 62, 63, and 64 indicate the ratios of images extracted from the four image groups G301, G302, G303, and G304, respectively. In the initial state, the widths of the regions 61, 62, 63, and 64 correspond to the ratio of the number of images included in the four image groups G301, G302, G303, and G304. For example, in the initial state, the widths of the regions 61, 62, 63, and 64 are 4:3:2:1. The regions 61, 62, 63, and 64 display the representative images of the images included in the four image groups G301, G302, G303, and G304, respectively.

A boundary line 71 formed between the regions 61 and 62, a boundary line 72 formed between the regions 62 and 63, and a boundary line 73 formed between the regions 63 and 64 can be moved by dragging in the left-right direction using the mouse 17, and the widths of the regions 61, 62, 63, and 64 can be changed. In a case where the boundary line 71 is moved to the left side, the width of the region 61 is decreased, and the width of the region 62 is increased. Thus, the number of images extracted from the image group G301 is decreased, and the number of images extracted from the image group G302 is increased. Conversely, in a case where the boundary line 71 is moved to the right side, the width of the region 61 is increased, and the width of the region 62 is decreased. Thus, the number of images extracted from the image group G301 is increased, and the number of images extracted from the image group G302 is decreased. In a case where the boundary line 72 is moved to the left side, the width of the region 62 is decreased, and the width of the region 63 is increased. Thus, the number of images extracted from the image group G302 is decreased, and the number of images extracted from the image group G303 is increased. In a case where the boundary line 72 is moved to the right side, the width of the region 62 is increased, and the width of the region 63 is decreased. Thus, the number of images extracted from the image group G302 is increased, and the number of images extracted from the image group G303 is decreased. Similarly, in a case where the boundary line 73 is moved to the left side, the width of the region 63 is decreased, and the width of the region 64 is increased. Thus, the number of images extracted from the image group G303 is decreased, and the number of images extracted from the image group G304 is increased. Conversely, in a case where the boundary line 73 is moved to the right side, the width of the region 63 is increased, and the width of the region 64 is decreased. Thus, the number of images extracted from the image group G303 is increased, and the number of images extracted from the image group G304 is decreased. In such a manner, the ratio of the number of images extracted from the image groups G301, G302, G303, and G304 can be changed.

While the bar graph 60 is displayed in the example illustrated in FIG. 9, one linear graph such as the slide bar 51B may be displayed as illustrated in FIG. 8, and a plurality of sliders changing the ratio of the number of images to be extracted from the image groups G301, G302, G303, and G304 depending on the positions of the sliders may be formed in the one graph. The ratio of the number of images extracted from the image groups G301, G302, G303, and G304 can be changed depending on the position of each of the plurality of sliders. Furthermore, a circle graph may be displayed, and the ratio of the number of images extracted from the image groups G301, G302, G303, and G304 may be changed by changing the ratio of regions in the circle.

The ratio of extracted images is perceived at a glance, and the ratio can be relatively simply changed.

Modification Example

Table 1 is one example of an image extraction table defining the manner of image extraction.

TABLE 1

| Image Group | Ratio of Number of Images | Extraction Method | | | | | |
|---|---|---|---|---|---|---|---|
| | | 1 | 2 | 3 | 4 | 5 | 6 |
| G301 | 40% | Extract | Extract | Extract | 0 | 0 | 0 |
| G302 | 30% | Extract | Extract | 0 | Extract | 0 | 0 |
| G303 | 20% | Extract | 0 | 0 | 0 | Extract | 0 |
| G304 | 10% | Extract | 0 | 0 | 0 | 0 | Extract |

The image extraction table is stored in the memory 15.

In the image extraction table, the number of images included in each image group is stored in correspondence with the specified number of image groups G301, G302, G303, and G304. In addition, information indicating whether or not to extract images from each of the image groups G301, G302, G303, and G304 based on a plurality of image extraction methods is also stored in the image extraction table.

Extraction Method 1 is extracting images from all of the four image groups G301, G302, G303, and G304. As described above, images are extracted from each of the four image groups G301, G302, G303, and G304 at the ratio corresponding to the ratio of the number of images.

Extraction Method 2 is extracting images from an image group having the ratio of the number of images greater than or equal to a threshold and not equal to zero. For example, in a case where it is assumed that the ratio of the number of images as the threshold is defined as 30%, images are extracted at a ratio of 4:3 (may be 1:1) from the image groups G301 and G302 having the ratio of the number of images greater than or equal to 30% in correspondence with the ratios of the image groups G301 and G302. Images are not extracted (represented by zero) from the image groups G303 and G304 having the ratio of the number of images less than 30%.

Extraction Methods 3 to 6 are extracting images from any of the four image groups G301, G302, G303, and G304. Extraction Method 3 is extracting images from only the image group G301 having the highest ratio of images and not extracting images from the other image groups G302, G303, and G304. Extraction Method 4 is extracting images from the image group G302 which is any one of the image groups G301 and G302 having the ratio of the number of images greater than or equal to the threshold (for example, greater than or equal to 30%) and not extracting images from the other image groups. Extraction Method 5 is extracting images from the image group G303 which is any one of the image groups G301, G302, and G303 having the ratio of the number of images greater than or equal to the threshold (for example, greater than or equal to 20%) and not extracting images from the other image groups. Similarly. Extraction Method 6 is extracting images from the image group G304 which is any one of the image groups G301, G302, G303, and G304 having the ratio of the number of images greater than or equal to the threshold (for example, greater than or equal to 10%) and not extracting images from the other image groups.

The extraction method to be used for extracting images among Extraction Methods 1 to 6 is decided in advance, and images are extracted using the method. The extraction method may be selected by the user, and images may be extracted from the image groups G301, G302, G303, and G304 in accordance with the selected extraction method.

For example, in a case where Extraction Method 2 is selected, an album configured with persons and scenery at a ratio of 4:3 is created. In a case where Extraction Method 3, 4, 5, or 6 is selected, an album of scenery, an album of dogs, or an album of manholes is created.

A variety of albums matching the preference of the user are created.

While the image extraction process is performed using the client computer 1 in the above examples, a tablet terminal, a smartphone, or a dedicated image processing apparatus can also be used.

Processing units executing the above process include not only the CPU 10 functioning as various processing units by executing software but also a programmable logic device such as a field-programmable gate array (FPGA) capable of changing a circuit configuration after manufacturing, a dedicated electric circuit such as an application specific integrated circuit (ASIC) having a circuit configuration dedicatedly designed to execute a specific process, and the like.

One processing unit may be configured with one of those various processors or may be configured with a combination of two or more processors of the same type or different types (for example, a plurality of FPGAs or a combination of a CPU and an FPGA). A first example of configuring a plurality of processing units with one processor is such that as represented by a computer such as a client computer or a server, one processor is configured with a combination of one or more CPUs and software, and the processor functions as the plurality of processing units. A second example is such that as represented by a system on chip or the like, a processor that implements the function of the whole system including the plurality of processing units using one integrated circuit (IC) chip is used. Various processing units are configured using one or more of the various processors as a hardware structure.

Furthermore, the hardware structure of the various processors is more specifically an electric circuit in which circuit elements such as a semiconductor element are combined.

What is claimed is:

1. An image processing apparatus comprising:
a processor, wherein
the processor is to
classify a plurality of images into a plurality of image groups such that images having a similarity greater than or equal to a threshold are grouped; and
extract an amount of images from each image group depending on a ratio of a number of images included in each respective image group, wherein the ratio for each respective image group is the number of images in a respective image group to a total sum of the number of images in the plurality of image groups, wherein the processor is to
specify a ratio of the number of images to be extracted from each image group of the plurality of image groups,
extract the amount of images from each image group depending on the specified ratio,
control a display device to display a representative image of images included in each image group of the plurality of image group on a display screen, and
control the display device to display a specifying unit specifying the ratio of images in correspondence with the representative image on the display screen.

2. The image processing apparatus according to claim 1, wherein the processor is to create an image product using the extracted images.

3. The image processing apparatus according to claim 1, wherein the processor is to extract the amount of images from each image group in which the ratio of the number of images included in each image group of the plurality of image groups is not equal to zero and is greater than or equal to a threshold.

4. The image processing apparatus according to claim 3, wherein the processor is to extract the amount of images from each image group in which the ratio of the number of images included in each image group of the plurality of image groups is not equal to zero and is greater than or equal to the threshold depending on the ratio of the number of images included in the image group.

5. The image processing apparatus according to claim 3, wherein processor is to extract the amount of images from any one image group of the image groups in which the ratio of the number of images included in each image group of the plurality of image groups is not equal to zero and is greater than or equal to the threshold.

6. The image processing apparatus according to claim 1, wherein the processor is to extract the amount of images from images included in one image group of the plurality of image groups.

7. The image processing apparatus according to claim 1, further comprising:
the processor is to perform a ratio of the number of images included in each image group of the plurality of image groups.

8. The image processing apparatus according to claim 1, wherein the processor is to control the display device to display a marker of which a display position is changeable on the display screen, and
specify the ratio of the images depending on the position of the marker.

9. The image processing apparatus according to claim 1, wherein the processor is to control the display device to display a graph having a length or an area corresponding to the ratio of the number of images on the display screen, and
specify the ratio of the images by changing the length or the area of the graph.

10. The image processing apparatus according to claim 1, wherein the processor is to receive an input of a number of image groups to be classified, and
the processor is to perform the classifying into image groups corresponding to the number input.

11. The image processing apparatus according to claim 1, wherein the processor is to perform the classifying into the plurality of image groups based on a plurality of feature amounts of the images such that the images having the similarity greater than or equal to the threshold are grouped.

12. The image processing apparatus according to claim 1, wherein the processor is to perform the classifying into a first plurality of image groups based on a plurality of feature amounts of the images such that the images having the similarity greater than or equal to the threshold are grouped, and classify the plurality of images into the plurality of image groups such that the images having the similarity greater than or equal to the threshold are grouped by combining image groups in which the similarity between the image groups is greater than or equal to the threshold among the first plurality of image groups.

13. The image processing apparatus according to claim 1, wherein the processor is to not perform the classifying into the plurality of image groups based on a similarity between subjects recognized as being included in the images.

14. An image processing method comprising:

classifying a plurality of images into a plurality of image groups by a processor such that images having a similarity greater than or equal to a threshold are grouped; and extracting an amount of images by the processor from each image group depending on a ratio of a number of images included in each respective image group of the plurality of classified image groups, wherein the ratio for each respective image group is the number of images in a respective image group to a total sum of the number of images in the plurality of image groups, wherein the method comprises:

specifying a ratio of the number of images to be extracted from each image group of the plurality of image groups, extracting the amount of images from each image group depending on the specified ratio, controlling a display device to display a representative image of images included in each image group of the plurality of image group on a display screen, and controlling by the processor the display device to display a specifying unit specifying the ratio of images in correspondence with the representative image on the display screen.

15. A non-transitory recording medium storing program readable by a computer of an image processing apparatus and controlling the computer of the image processing apparatus to perform:

classifying a plurality of images into a plurality of image groups such that images having a similarity greater than or equal to a threshold are grouped; and extracting an amount of images from each image group depending on a ratio of a number of respective images included in each image group of the plurality of classified image groups, wherein the ratio for each respective image group is the number of images in a respective image group to a total sum of the number of images in the plurality of image groups, wherein the computer is controlled to perform:

specifying a ratio of the number of images to be extracted from each image group of the plurality of image groups, extracting the amount of images from each image group depending on the specified ratio, controlling a display device to display a representative image of images included in each image group of the plurality of image group on a display screen, and controlling the display device to display a specifying unit specifying the ratio of images in correspondence with the representative image on the display screen.

* * * * *